United States Patent
Towers et al.

(10) Patent No.: US 6,203,119 B1
(45) Date of Patent: Mar. 20, 2001

(54) CONTROL APPARATUS FOR A BRAKE SYSTEM

(75) Inventors: Kenneth Scott Towers, Granger, IN (US); John E. Mackiewicz, Niles, MI (US); Richard Becker McClain, South Bend, IN (US); Raymon Kosarski, Jr., Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/365,577

(22) Filed: Aug. 2, 1999

(51) Int. Cl.⁷ .................................................. B60T 8/44
(52) U.S. Cl. ................................. 303/114.1; 303/52
(58) Field of Search .................. 303/6.01, 52, 114.1, 303/114.2; 60/547.1, 551, 553

(56) References Cited

U.S. PATENT DOCUMENTS

| | | | |
|---|---|---|---|
| 3,870,377 | * | 3/1975 | Belart et al. ............................ 303/52 |
| 3,927,915 | * | 12/1975 | Adachi .................................... 303/52 |
| 4,357,055 | * | 11/1982 | Leiber et al. .......................... 303/52 |
| 4,405,183 | * | 9/1983 | Resch ...................................... 303/52 |
| 4,604,870 | * | 8/1986 | Bach et al. ............................. 60/551 |
| 4,653,814 | * | 3/1987 | Burgdorf ................................ 303/52 |
| 4,964,676 | * | 10/1990 | Resch ................................... 188/358 |
| 5,112,115 | * | 5/1992 | Willmann et al. .................... 188/358 |
| 5,142,865 | * | 9/1992 | Sakakihara et al. ..................... 60/55 |

* cited by examiner

Primary Examiner—Christopher P. Schwartz
(74) Attorney, Agent, or Firm—Leo H. McCormick, Jr.; Warren Comstock

(57) ABSTRACT

A control apparatus (12) for a brake system (10) having a housing (40) with a first (42) and second (46) cylindrical members located in first (44) and second (46) bores. The first (42) and second (46) cylindrical members and corresponding first (50) and second (54) valve seat members define first (52) and second (56) chambers within the first (44) and second (46) bores which are connected to a source of pressurized fluid. First valve means (68) are located in the first chamber (52) and second valve means (70) are located in the second chamber (56). A first plunger means (72) in the first bore (40) and a first valve seat member (50) define a first brake chamber (74) which is connected to a first set (16) of wheel brakes and a second plunger means (76) in the second bore (48) and a second valve seat member (54) define a second brake chamber (78) in the second bore (46) which is connected to a second set (16') of wheel brakes in the vehicle. A first stem (82) of the first plunger means (72) and a second stem (88) of the second plunger means (76) is connected to a balance lever (100) connected to an input rod (18). An input force applied to the input rod (18) simultaneously moves the stems (82,88) to initially interrupt communication between chambers (74,78) and a reservoir 84. Thereafter, further movement of stems (82,88) moves balls (67,67') away from valve seat members (50,54) and allows metered pressurized fluid to be communicated to the first (16) and second (16') set of wheel brakes to effect a primary brake application. In response to dynamic conditions sensed by a cpu (17), solenoid valves (21,25) are activated to allow pressurized fluid to move the first (50) and second (54) valve seat members into corresponding engagement with first (72) and second (76) plunger means initially interrupt communication between chambers (74,78) and reservoir (84). Thereafter, further movement of the first (50) and second (54) valve seat members allows metered pressurized fluid to be communicated to the first (16) and second (16') set of wheel brakes to effect a secondary brake application and attenuate a dynamic condition experienced by the vehicle.

11 Claims, 6 Drawing Sheets

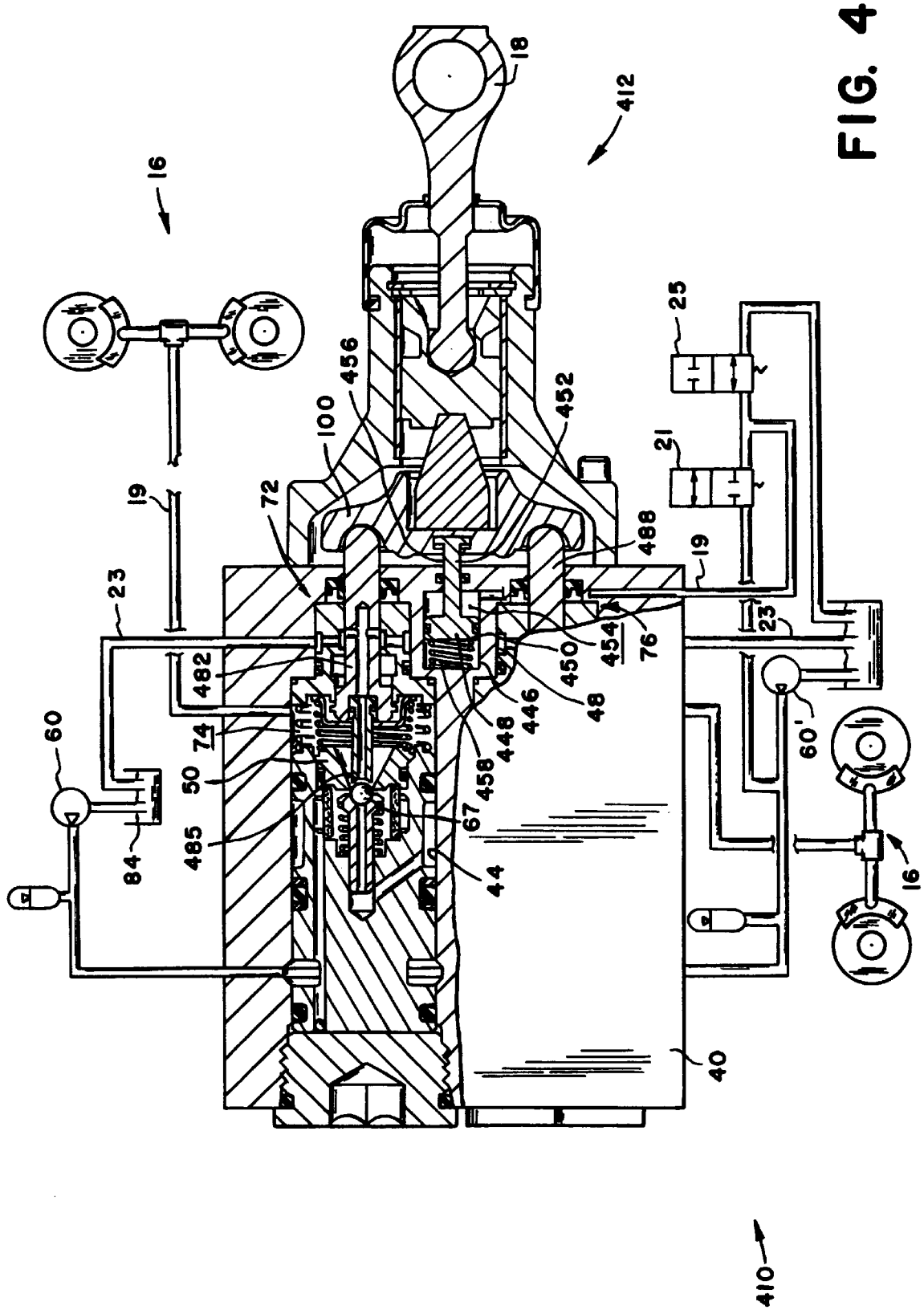

CONTROL APPARATUS FOR A BRAKE SYSTEM

This invention relates to a brake system having a primary actuator responsive to an operator to effect a first brake application and a secondary actuator responsive to dynamic forces experience by a vehicle to effect a second brake application and attenuate the dynamic forces.

BACKGROUND OF THE INVENTION

In brake systems, it is common to use a hydraulic booster for supplying a master cylinder with an input force to effect a brake application such as disclosed in U.S. Pat. No. 5,120,115. When a traction control function is added to this type hydraulic booster in a manner as disclosed in U.S. Pat. No. 4,815,793, the total length may become an issue in a vehicle where under the hood space is limited. In order to reduce the overall length of this type hydraulic brake booster, it has been disclosed in U.S. Pat. No. 4,843,819 to use parallel boost pistons, which are connected to a master cylinder. However, when under the hood space is critical, a brake booster of the type disclosed in U.S. Pat. No. 4,514,981 has been used to control the supply of pressurized fluid to effect a brake application. These hydraulic brake boosters have satisfied many of the operational requirements of vehicle braking systems but space requirements and safety parameters continually limit the availability of current available brake boosters.

SUMMARY OF THE INVENTION

The present invention defines a hydraulic brake booster, which combines a reduction in the physical dimensions, and structure through which the speed of application can maintain the operational demands of a vehicle within an acceptable safety specification.

The hydraulic brake booster has a control apparatus through which pressurized fluid is supplied to wheel brakes by a primary actuation system acting in response to an operational input from an operator for effecting a first brake application and by a secondary actuation system means acting in response to a dynamic input derived from the operation of a vehicle for independently effecting a second brake application. The control apparatus has a housing with a first cylindrical member located in a first bore and a second cylindrical member located in a second bore. The first cylindrical member and a first valve seat member define a first chamber within the first bore while the second cylindrical member and a second valve seat member define a second chamber within the second bore. The first and second chambers are connected to a source of pressurized fluid. First valve means are located in the first chamber and second valve means are located in the second chamber. A first plunger means is resiliently positioned in the first bore and with the first valve seat member define a first brake chamber in the first bore. The first brake chamber is connected to a first portion of the brake system for the vehicle. A second plunger means is resiliently positioned in the second bore and with the second valve seat define a second brake chamber in the second bore. The second brake chamber is connected to a second portion of the brake system for the vehicle. The first plunger means includes a first stem through which the first brake chamber is connected with a reservoir while the second plunger means includes a second stem through which the second brake chamber is connected with the reservoir. An input means is connected to the first and second plunger means and is responsive to an input force for respectively moving the first and second stems into engagement with the first and second valve means to initially terminate communication between the first and second brake chambers and the reservoir. The input force acts on and further moves the first valve means with respect to the first valve seat member and the second valve means with respect to the second valve seat to allow metered pressurized fluid communication between the first chamber and the first portion of said brake system by way of the first brake chamber and between the second chamber and the second portion of the brake system by way of the second brake chamber to effect a brake application as the primary brake system of the vehicle. Many of the components in the primary brake system are also used in the secondary actuation system which is characterized by actuation means for independently moving the first and second valve seat members with respect to the first and second valve means in response to a dynamic input signal to initially interrupt communication through the first and second stems to the reservoir and thereafter initiating communication of metered pressurized fluid from the first and second chambers to the first and second portions of the brake system by way of the first and second brake chambers to effect a second brake application and attenuate a dynamic operation of the vehicle.

An advantage of the present invention resides in structure through which a valve seat is moved to effect a secondary actuation of a hydraulic brake booster and attenuate a dynamic condition experienced by a vehicle.

A further advantage of this invention resides in a parallel bore hydraulic brake booster having mutually exclusive primary and secondary actuation of control valves to selectively effect the actuation of wheel brakes of a vehicle.

A further advantage of this invention resides in a control having first and second valves rough which primary and secondary linkages respectively respond a manual input and a hydraulic input derived from a dynamic condition to effect a brake application in a vehicle.

BRIEF DESCRIPTION OF THE DRAWINGS

FIG. 4 is a fourth embodiment of the brake booster of the present invention;

DETAILED DESCRIPTION

Figure 1:
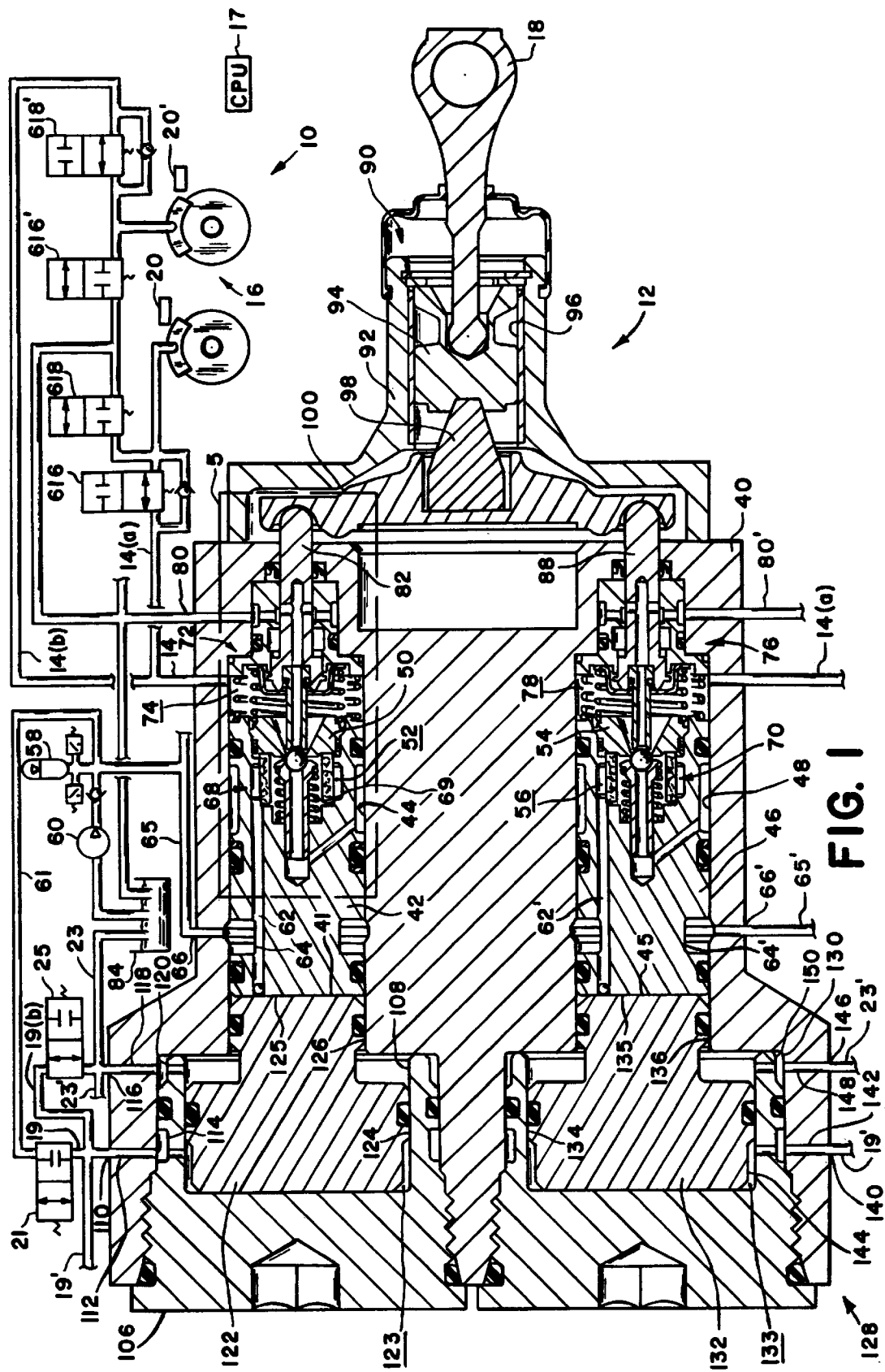
FIG. 1 is a schematic illustration of a brake system having a brake booster made according to the present invention.

The brake system 10 as illustrated in FIG. 1 has a hydraulic booster 12 with a first conduit 14 connected to a first set 16 of wheel brakes and a second conduit 14' connected to a second set of wheel brakes (not shown). An input force applied to pedal rod 18 activates the hydraulic booster 12 to develop a primary braking force to effect a first brake application in the brake system of the vehicle while sensors respond to dynamic forces experienced by the vehicle to communicate a signal to a cpu 17 which activates various solenoid valves for the development of a secondary braking force to attenuate the dynamic forces in the vehicle.

Throughout this specification various components used in the primary brake system are also used in the secondary brake and are identified by the same number in this specification. Where a same component is used in more than in a portion of the brake system 10, where appropriate, the same number is used in the drawings with a "'" to identify the additional same component.

The first set 16 of wheel brake includes typical wheel speed sensors 20 and various solenoid valves 616 and 618 for each individual wheel, all of which are connected to the cpu 17 for the vehicle. In the specification and the drawings, the structural representation and function description of the first set 16 of wheel brakes shall be considered to be applicable to the second set 16' of wheel brakes.

The hydraulic booster 12 has a housing 40 with a first cylindrical member 42 located in a first bore 44 and a second cylindrical member 46 located in a second bore 48. The first cylindrical member 42 and a first valve seat member 50 define a first chamber 52 in the first bore 42 while the second cylindrical member 46 and a second valve seat member 54 define a second chamber 56 in the second bore 48. The first chamber 52 is connecting to a source of pressurized fluid, developed through the operation of pump 60 and retained in accumulator 58, by way of passage 62, groove 64, port 66 and conduit 65. Similarly, chamber 56 is connected to the source of pressurized fluid, an accumulator (not shown), by way of passage 62', groove 64', port 66' and conduit 65'. The first bore 44 and second bore 48 are parallel to each other and each adapted to supply one half of a required pressurized fluid to effect a balance brake application as a function of the actuation of a first control valve 68 located in the first chamber 52 in the first bore 44 and a second control valve 70 located in chamber 56 in the second bore 48. A first plunger means 72 resiliently positioned in the first bore 44 along with the first valve seat member 50 define a first brake chamber 74 while a second plunger means 76 resiliently positioned in the second bore 48 along with the second valve seat 54 define a second brake chamber 78. The first brake chamber 76 is connected to a first portion or first set of wheel brakes 16 and the second brake chamber 78 is connected to a second portion or second set of wheel brakes 16' in the brake system 10.

The first plunger means 72 includes a first stem 82 through which the first brake chamber 74 is connected with a return conduit 80 for reservoir 84 and a second plunger means 76 includes a second stem 88 through which the second brake chamber 78 is connected with the return conduit 80' for reservoir 84.

An input means 90 which is connected to the first 82 and second 76 plunger means in addition to push rod 18 includes a plunger 94 which slides in bore 96 of end member 92, a reaction disc 98 and a balance lever 100. The balance lever 100 divides an input force between the first stem 82 of the first plunger means 72 and the second stem 88 for the second plunger means 76.

A first plug or end cap 106, which is secured to housing 40 to seal bore 44, has a first actuation bore 108 located therein. Actuation bore 108 is connected to the source of pressurized fluid developed by pump 60 by way of groove 114, passage 112, actuation port 110, and conduit 19 connected to a first solenoid 21 and by conduit 19a to a second solenoid 25 and to reservoir 84 by way of groove 120, passage 118, relief port 116 and conduit 23. A first piston 122 associated with end cap 106 has a first diameter section 124 located in actuation bore 108 and a second diameter section 126 located in the first bore 44 of housing 40. The first piston 122 has a face 125 in axial alignment with and engages the end face 41 of cylindrical member 42.

A second plug or end cap 128, which is secured to housing 40 to seal bore 48, has a second actuation bore 130 located therein. Actuation bore 130 is connected to the source of pressurized developed by pump 60 by way of groove 144, passage 142, actuation port 140, and conduit 19' connected to the first solenoid 21' and to reservoir 84 by way of groove 150, passage 148, relief port 146 and conduit 23'. A second piston 132 associated with end cap 128 has a first diameter section 134 located in actuation bore 130 and a second diameter section 136 located in the first bore 48 of housing 40. The second piston 132 has a face 135 in axial alignment with and engages the end face 45 of cylindrical member 46.

Mode of Operation

In a vehicle having a brake system 10 when an operator desires to effect a brake application, and input force is applied to pedal 18 to initiate braking through the primary brake system. The input force applied to pedal 18 moves plunger 94 and communicates an input force through reaction disc 98 to the balance lever 100. The balance lever 100 acts on and supplies stem 82 of the first plunger means 72 and stem 88 of the second plunger means 76 with substantially equal forces. The functional operation of the first 72 and second 76 plunger means is identical and as a result only the operation of the first plunger means 72 through which pressurized fluid is supplied to the first set of wheel brakes 16 is described in detail in FIGS. 5a and 5b for the operation of the primary braking system.

Figure 5A:
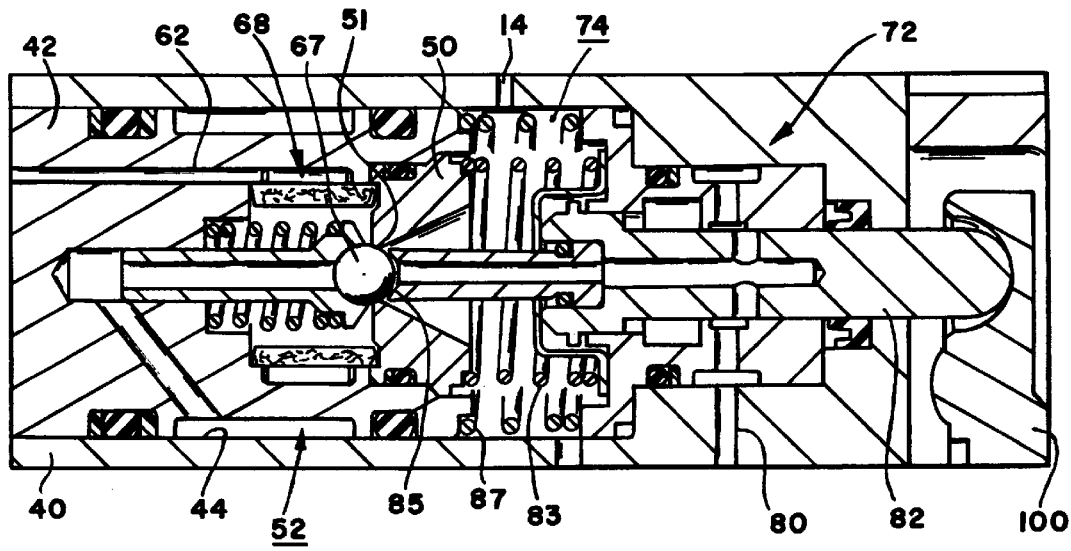
FIG. 5a is an enlarged view of the conscribed area 5 in FIG. 1 illustrating a valve in a rest position for the primary brake system.
Figure 5B:
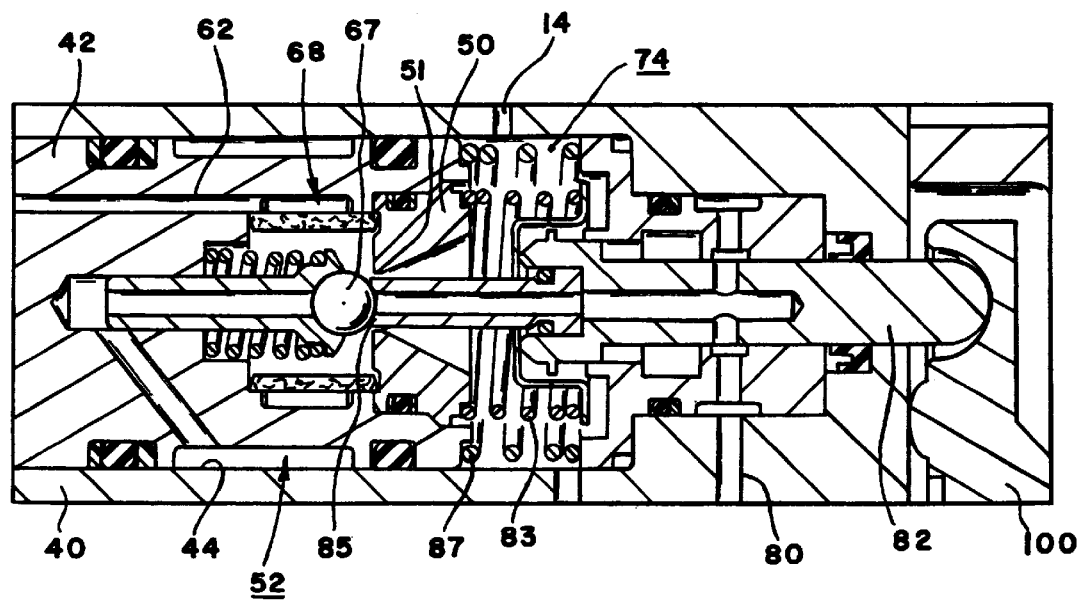
FIG. 5b is an enlarged view of the conscribed area 5 in FIG. 1 illustrating a valve in an actuated position for the primary brake system.

The input force as received by stem 82 after overcoming return spring 83 moves end 85 into engagement with ball 67 in the first valve means 68 to interrupt communication between chamber 74 and reservoir 84 as shown in FIG. 5(a). Additional movement of stem 82 causes ball 67 to move off seat 51 of the first valve seat member 50 as shown in FIG. 5(b) to allow metered pressurized fluid to flow into chamber 74 for communication to the first set of wheel brakes 16 by way of conduit 14. Conduit 14 has a first branch 14a which communicates a first wheel brake and 14b which communicated a second wheel brake as a function of opening solenoid valves 616,616' and closing solenoid valve 618, 618' by operating signals from the cpu 17. The braking of the vehicle being coordinated by signals received from sensors 20,20' associated with the individual wheel brakes by the cpu 17 to effect a smooth and effective brake application through the primary brake system.

When the operator terminates the input force on pedal 18, return spring 83 acts on stem 82 to allow valve spring 69 to move ball 67 into engagement with seat 51 to terminate communication of pressurized fluid from chamber 52 to chamber 74. Thereafter, return spring 83 moves end 85 away from ball 67 to allow pressurized fluid to be returned to reservoir 84 from the wheel brakes as solenoids 616, 616' are closed and solenoids 618,618' are opened by way of stem 82 and conduit 80.

Figure 5C:
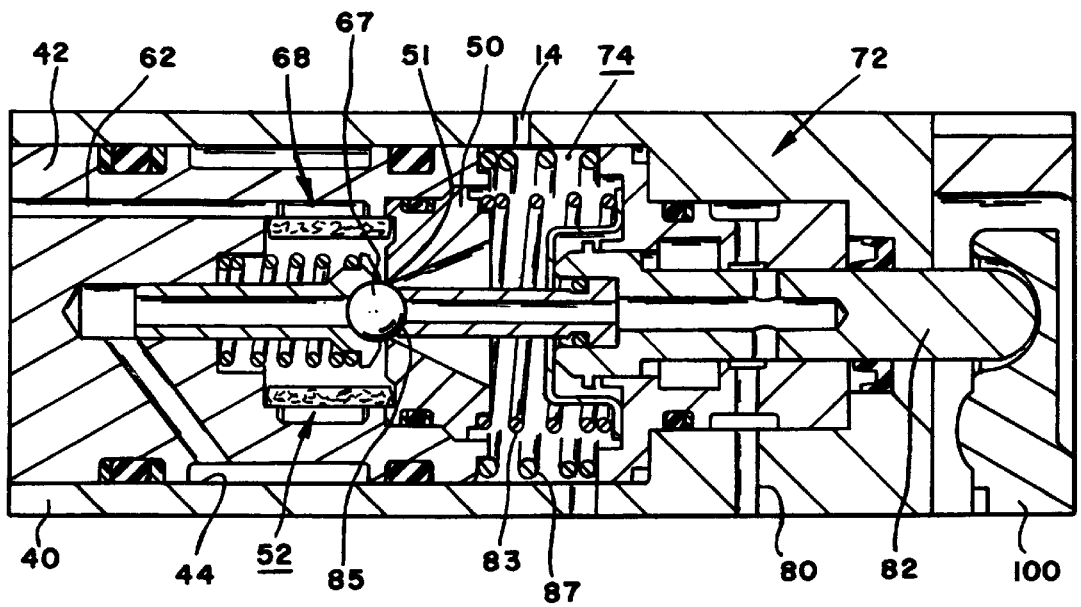
FIG. 5c is an enlarged view of the conscribed area 5 in FIG. 1 illustrating valve in an initial actuated position for the secondary brake system.
Figure 5D:
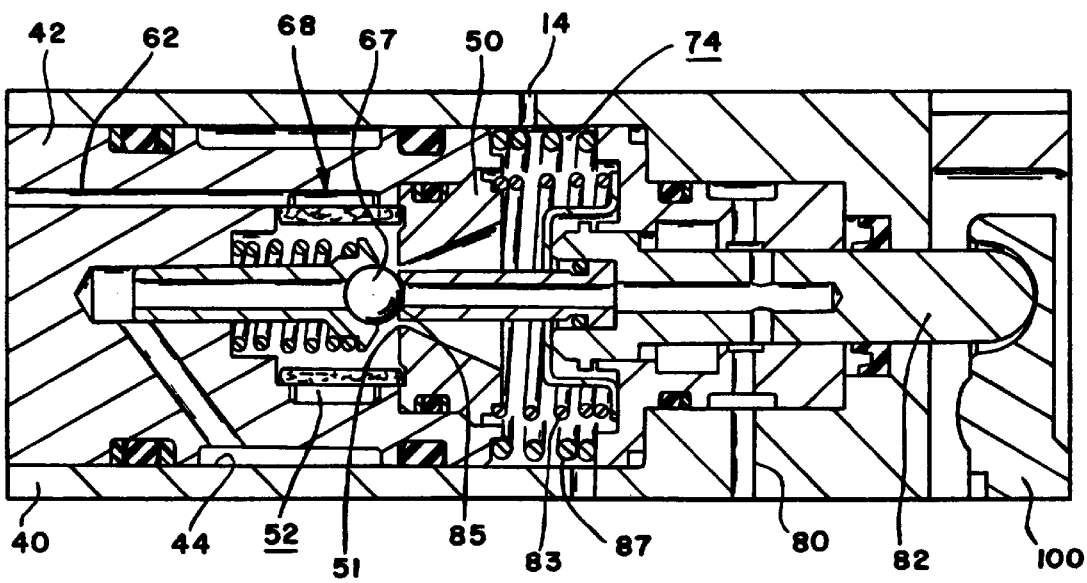
FIG. 5d is an enlarged view of the conscribed area 5 in FIG. 1 illustrating a valve in an actuated position for the secondary brake system.

When a vehicle is operating on a road various sensors, including sway, acceleration, speed sensors and in some instances even speed of closure with respect to another vehicle or fixed object, provide inputs to the cpu 17 which are evaluated with respect to the dynamic operation of the vehicle. If the dynamic operation of the vehicle is outside of a desired operational specification, the cpu 17 institute secondary braking to attenuate the dynamic conditions experienced by the vehicle. In instituting the secondary braking, a signal is first communicated to solenoid 25 to close communication from secondary actuation chambers 123 and 133 through conduit 19a and 23 to reservoir 84 and open communication from the source of pressurized fluid from pump 60 to the secondary actuation chambers by way of conduit 61,19 and 19'. The fluid pressure in chambers 123 and 133 acts on pistons 122 and 132 to develop a force which is correspondingly transmitted into axial movement of cylindrical members 42 and 46 to develop fluid pressure which operates the secondary brake system and effect a brake application in the first 16 and second 16' set of wheel brakes. The development of the fluid pressure occurs in the following manner, after a force sufficient to overcome return spring 87 develops, cylindrical members 42 and 46 respectively, move in bores 44 and 48 to bring balls 67,67' into engagement with the ends 85,85 of stems 82 and 88 to terminate communication between chambers 74 and 78 and reservoir 84 as best shown in FIG. 5(c). Thereafter, the force moves cylindrical members 42 and 46 such that balls 67,67' and stems 82 and 88 remain stationary and the first 50 and second 54 valve seat members move to allow metered pressurized fluid to flow from chambers 52 and 56 to the first 16 and second wheel brakes as shown in FIG. 5(d) to effect a brake application. The rotational speed of the wheels during this brake application are sensed, at least by sensors 20,20', and evaluated with other vehicle operational inputs by the cpu 17 to determine the current dynamic conditions experienced by the vehicle. The individual wheels of the vehicle are continually supplied with pressurized fluid as a function of the sensed conditions and operation of solenoid valve 616,616' and 618,618'. Further, the cpu 17 continues to supply the operational signal to solenoids 25 and 21 until the dynamic conditions return to an acceptable level as measured by the sensors. Once the dynamic condition is attenuated to an acceptable level, solenoid 21 is closed and solenoid 25 is opened to allow pressurized fluid communication from chambers 123 and 133 as return springs 87,87' respectively move valve seats members 50 and 54 toward balls 67,67' of the first 68 and second 70 valve members to terminate communication of pressurized fluid from chambers 52 and 56 to chambers 74 and 78. Further movement of the first valve member 68 secured to cylindrical member 42 and the second valve member 70 secured to cylindrical member 46 correspondingly moves the balls 67,67 away from the ends 85,85' on stems 82 and 88 to allow pressurize fluid to be communicated to reservoir 84 by way of conduits 80,80'.

Figure 2:
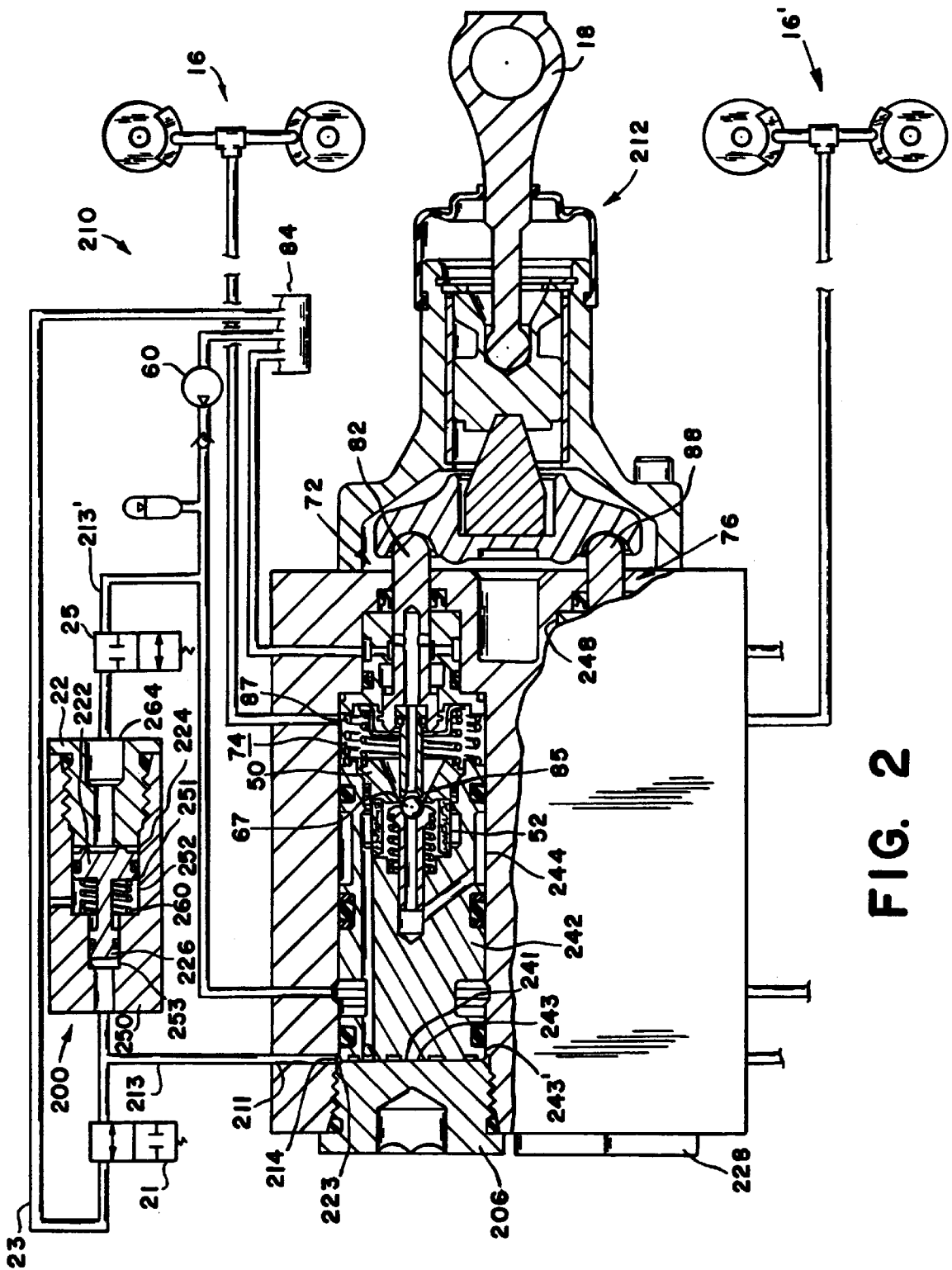
FIG. 2 is a second embodiment of the brake booster of the present invention.
Figure 3:
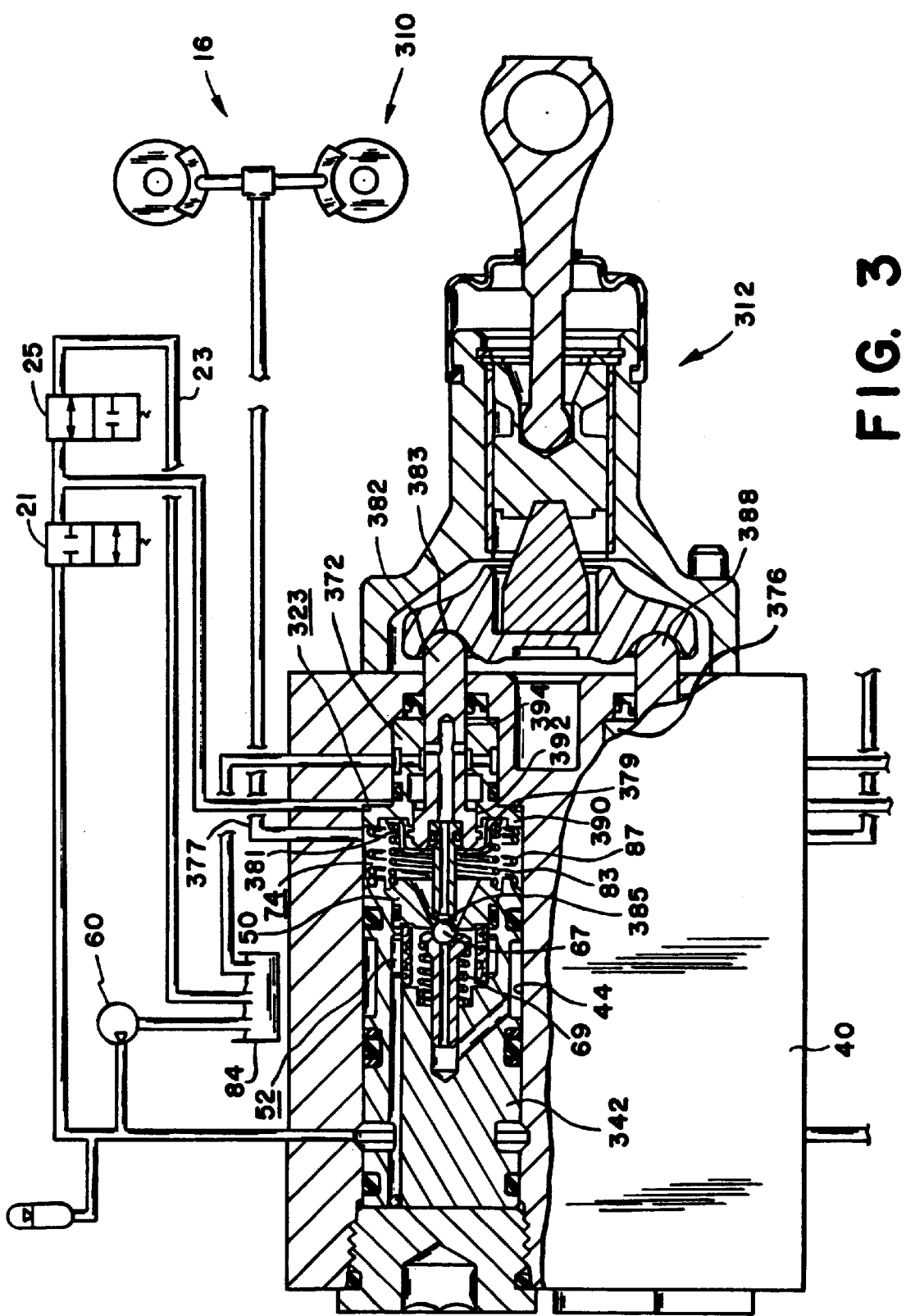
FIG. 3 is a third embodiment of the brake booster of the present invention.

The brake system 10 as illustrated in FIG. 1 is functionally acceptable for the operation of most vehicles and provides a secondary actuation capability to accommodate conditions experienced when operating under adverse circumstances to maintain control and stability for most vehicles, however, several alternative embodiments as disclosed in FIGS. 2, 3 and 4 may provide characteristics better suited for certain applications.

The hydraulic booster 212 for the brake system 210, shown in FIG. 2 for the secondary braking system includes an external pressure intensifier 200. In the hydraulic booster 212 many of the components are the same as in FIG. 1 and the same reference numbers are used to identify such components and only those components that are different are described in detail. The cylindrical body 242 which is located in bore 244 has a plurality of hold off projections 243 on end 241 which engage end cap 206 to define chamber 223. Chamber 223 being connected to the pressure intensifier 200 by way of groove 214, passage 211 and conduit 213. Similarly end cap 228 is used to close bore 248 wherein the components associated with the second 16' set of wheel brakes are located.

The pressure intensifier 200 includes a housing 250 with a stepped bore 252 therein connected to chamber 223 by conduit 213 and to the source of pressurized fluid developed by pump 60 by conduit 223. A piston 222 located in stepped bore 252 has a first diameter 224 located in diameter 251 and a second diameter 226 located in diameter 253. An end cap 228 attached to housing 250 seals bore 252 and a spring 260 acts on and urges piston 222 toward end cap 228.

The functional operation of hydraulic booster 212 in the primary mode of operation is identical to booster 12 described above with respect to FIG. 1 in that an input force applied to pedal rod 18 acts on the first 72 and second 76 plunger means to move stems 82 and 88 into engagement with balls 67 to interrupt communication between chambers 74 and 78 and reservoir 84. Further movement of the first 72 and second 76 plunger means respectively move balls off the first 50 and second 54 seat members to allow metered pressurized fluid to flow into chambers 74 and 78 for distribution to the first (16) and second (16') set of wheel brakes to effect a brake application.

Whenever the operating parameters transmitted by sensor in the vehicle indicate undesirable dynamic forces are being experienced or are likely to occur, the cpu 17 transmits an operating signal to solenoid 21 to close communication between chamber 223 and reservoir 84 and thereafter opens solenoid 25 between the source of pressurized fluid developed by pump 60 and port 264 in housing 250 of the pressure intensifier 200. The fluid pressure received at port 264 acts on the large diameter 224 of piston 222 and moves the small diameter 226 in bore 252 to provide a corresponding high pressure fluid input to chamber 223. This high pressure input supplied to chamber 233 acts on the first cylindrical member 242 to initially move ball 67 toward end 85 of stem 82 to interrupt communication between chamber 74 and reservoir 84. Further movement of the first cylindrical member 242 moves the valve seat member 50 away from the ball 67 and allows metered pressurized fluid to be communicated from chamber 52 to chamber 74 for distribution to the first set of wheel brakes 16 to effect a brake application. The structure and function of components of the second cylindrical member in the second bore being identical that of the first cylindrical member 242, and the actual distribution of pressurized fluid to operate the individual wheel brakes being selectively controlled by the actuation of solenoids 16,18 in response to a signal supplied by the cpu 17 to attenuate the dynamic conditions. On attenuation of the forces, which could produce the unwanted dynamic conditions, the cpu 17 terminates the input to solenoid 25 to close communication with the source of pressurized fluid developed by pump 60 and opens solenoid 21 to communicate fluid from chamber 223 to reservoir 84 by way of conduit 23. Return spring 87 acts on the first cylindrical member 242 to move the first valve seat member 50 into engagement with ball 67 to initially terminate communication from chamber 52 to chamber 74 and thereafter move the first cylindrical member 242 and ball 67 away from the end 85 of stem 82 to allow pressurized fluid in the brake system to be dissipated to the reservoir 84.

The hydraulic booster 312 for the brake system 310, shown in FIG. 3 for the secondary brake system is similar to that of FIG. 2 except for the secondary actuation components through which pressurized fluid is supplied to attenuate the dynamic conditions experienced by the vehicle. In the hydraulic booster 312 where the components are the same as in FIG. 2 the same reference numbers are used to identify the components and only those components that are different are described in detail.

The secondary actuation components include a first plunger means 372 and a second plunger means 376 which are identical in structure and function. The first plunger means 372 is herein describing in detail. The first plunger means includes a first stem 382 with a cylindrical body having a first end 385 and a second end 383. A second cylindrical body 390 concentric with stem 382 is located in bore 44 and with housing 40 defines a secondary dynamic actuation chamber 323 which is connected to the source of pressurized fluid developed by pump 60. Return spring 87 being located between the second cylindrical body 390 and the cylindrical body 342 while return spring 83 is located between the first valve seat member 50 and retainer 381 positioned on shoulder 379 of stem 382.

The functional operation of hydraulic booster 312 in the primary mode of operation is identical to booster 12 described above with respect to FIG. 1 in that an input force applied to pedal rod 18 acts on the first 372 and second 376 plunger means to move stems 382 and 388 into engagement with balls 67,67 to interrupt communication between chambers 74 and 78 and reservoir 84. The cylindrical bodies 390 remain stationary as stems 382 slide on lands 392 and 394 and as a result the input force need only to overcome the force of return spring 83 to move end 385 toward and engagement with ball 67 to interrupt communication between chamber 74 reservoir 84. Once end 385 engages ball 67 any further movement moves ball 67 off the first 50 seat members to allow metered pressurized fluid to flow into chamber 74 for distribution to the first 16 set of wheel brakes to effect a brake application.

Whenever the operating parameters transmitted by sensors in the vehicle indicate undesirable dynamic forces are being experienced or are likely to occur, the cpu 17 transmits an operating signal to solenoid 25 to close communication between chamber 323 and reservoir 84 and thereafter opens solenoid 21 between the source of pressurized fluid developed by pump 60 and chamber 323 in housing 40. The fluid pressure in chamber 323 acts on cylindrical member 390 and after overcoming return spring 87 engages rib 377 on stem 382 to move stem 382 and end 385 toward and into engagement with ball 67. Once end 385 engages ball 67 any further movement moves ball 67 off the first 50 seat members allows metered pressurized fluid to flow into chamber 74 for distribution to the first 16 set of wheel brakes to effect a brake application. The cpu 17 controls the communication of pressurized fluid to the individual wheel brakes to attenuate the effect of the dynamic conditions on the vehicle.

Once the dynamic conditions are attenuated, the cpu 17 terminates the operational signal to the solenoids 21 and 25 by first closing solenoid 21 to the source of pressurized fluid developed by pump 60 and then opening solenoid 25 to allow fluid in chamber 323 to flow to reservoir 84 by way of conduit 23. As the fluid pressure in chamber 323 is dissipated, return springs 83 and 87 acts on the first cylindrical member 390 to initially move end 385 and allow return spring 69 to move ball 67 into engagement with the first valve seat member 50 and terminate communication from chamber 52 to chamber 74 and thereafter move end 385 away from the ball 67 to allow pressurized fluid in the brake system to be dissipated to the reservoir 84.

The hydraulic booster 412 for the brake system 410, shown in FIG. 4 for the secondary brake system is similar to that of FIG. 3 except for the secondary actuation components through which pressurized fluid is supplied to attenuate the dynamic conditions experienced by the vehicle. In the hydraulic booster 412 where the components are the same as in FIG. 3 the same reference numbers are used to identify the components and only those components that are different are described in detail. In the hydraulic booster 412, housing 40 has a third axial bore 446 located between the first 44 and second 48 bore. A piston 448 having a head 450 is located in bore 446 to define a secondary actuation or dynamic chamber 454. Piston 448 is connected to balance lever 100 by linkage 452, which extends through opening 456 in housing 40. A spring 458 located in bore 446 acts on piston 448 and urges piston 448 toward the balance lever 100. Actuation chamber 454 is connected to the source of pressurized fluid developed by pump 60 through conduit 19. For safety considerations, the brake system shown in FIG. 4 illustrates a brake system having redundant sources of pressurized fluid (pumps 60,60').

The functional operation of the hydraulic booster 412 is essentially the same as with booster 12 described above with respect to FIG. 1 in that an input force applied to pedal rod 18 applied to balance lever 100 acts on the first 72 and second 76 plunger means to move stems 482 and 488 into engagement with balls 67 to interrupt communication between chambers 74 and reservoir 84 by way of conduits 23,23'. Once end 485 on stem 482 engages ball 67 any further movement moves ball 67 off the first seat member 50 to allow metered pressurized fluid to flow into chamber 74 for distribution to the first set of wheel brakes 16 by conduit 19 to effect a brake application. The cpu 17 supplies the solenoids 616,618 associated with the individual wheel 16,16' with an input to control the pressurized fluid and effect a braking application as a function of the input.

Whenever the operating parameters transmitted by sensors in the vehicle indicate undesirable dynamic forces are being experienced or are likely to occur, the cpu 17 transmits an operating signal to solenoid 25 to close communication between actuation chamber 454 and reservoir 84 and thereafter opens solenoid 21 between the source of pressurized fluid developed by pump 60 and chamber 454 in housing 40. The fluid pressure in chamber 454 acts on piston 448 and after overcoming return spring 458 moves piston 448 in bore 446 to pull balance lever 100 toward face 41. This force is equally divided between the first plunger means 72 and second 72 plunger means such that stem 482 moves toward the first valve seat member 450 and stem 488 moves toward the corresponding valve seat member after overcoming return spring 83. Once end 485 engages ball 67 communication between chambers 74 and 78 and reservoir 84 is terminated and any further movement moves ball 67 off the first 50 seat member to allow metered pressurized fluid to flow into chamber 74 for distribution to the first set of wheel brakes 16 and second set of wheel brakes 16' to effect a brake application. The cpu 17 controls the communication of pressurized fluid to the individual wheel brakes to attenuate the effect of the dynamic conditions on the vehicle. Once the dynamic conditions are attenuated, the cpu 17 terminates the operational signal to the solenoids 21 and 25 by closing solenoid 21 to the source of pressurized fluid developed by pump 60 and opening chamber 454 to reservoir 84 by way of conduit 23. As the fluid pressure in chamber 454 is dissipated, return springs 83 acts on stem 482 initially move end 485 and allow return spring 69 to move ball 67 into engagement with the first valve seat member 50 and terminate communication from chamber 52 to chamber 74 and thereafter move end 485 away from the ball 67 to allow pressurized fluid in the brake system to be dissipated to the reservoir 84.

We claim:

1. A control apparatus through which pressurized fluid is supplied to wheel brakes by primary means acting in response to an operational input from an operator for effecting a first brake application and by secondary means acting in response to a dynamic input derived from the operation of a vehicle for independently effecting a second brake application, said control apparatus having a housing with a first cylindrical member located in a first bore and a second cylindrical member located in a second bore, said first cylindrical member and a first valve seat member defining a first chamber and said second cylindrical member and a second valve seat member defining a second chamber, said first and second chambers being connected to a source of pressurized fluid, first valve means located in said first chamber and second valve means located in said second chamber, first plunger means resiliently positioned in said first bore and with said first valve seat member defining a first brake chamber in said first bore, said first brake chamber being connected to a first portion of said brake system, second plunger means resiliently positioned in said second bore and with said second valve seat defining a second brake chamber in said second bore, said second brake chamber being connected to a second portion of said brake system, said first plunger means including a first stem through which said first brake chamber is connected with a reservoir and said second plunger means including a second stem through which said second brake chamber is connected with said reservoir, and input means connected to said first and second plunger means and responsive to said input force for respectively moving said first and second stems into engagement with said first and second valve means to initially terminate communication between said first and second brake chambers and said reservoir and thereafter moving said first valve means with respect to said first valve seat member and said second valve means with respect said second valve seat to allow metered pressurized fluid communication between said first chamber and said first portion of said brake system by way of said first brake chamber and between said second chamber and said second portion of said brake system by way of said second brake chamber to effect a brake application, said secondary means being characterized by actuation means for independently moving said first and second valve seat members with respect to said first and second valve means in response to a dynamic input signal to initially interrupt communication through said first and second stems to said reservoir and thereafter initiating communication of metered pressurized fluid from said first and second chambers to said first and second portions of said brake system by way of said first and second brake chambers to effect said second brake application and attenuate the dynamic operation of the vehicle.

2. The control apparatus as recited in claim 1 wherein said secondary means is further characterized by:
   a first piston located in said first bore and aligned with said first cylindrical member;
   a second piston located in said second bore and aligned with said second cylindrical member; and
   actuation means for communicating pressurized fluid to said first and second bores in response to said dynamic input signal, said pressurized fluid acting on said first and second pistons to respectively move said first cylindrical member and said first valve seat member to move toward said first plunger means and said second cylindrical member and second valve seat member toward said second plunger means such that said first valve means engages said first plunger means and said second valve means engages said second plunger means to terminate communication between said first and second brake chambers and reservoir and thereafter initiate communicate metered pressurized fluid to the first and second portions of the brake system.

3. The control apparatus as recited in claim 2 wherein said secondary means is further characterized by:
   a first plug secured to said housing and having a first actuation bore, said first piston having a first diameter section located in said first actuation bore and a second diameter located in said first bore;
   a second plug secured to said housing and having a second actuation bore, said second piston having a first diameter section located in said second actuation bore and a second diameter located in said second bore, said actuation means supplying pressurized fluid to said first and second actuation bore to act on said first and second diameters of said first and second pistons to correspondingly move said first and second cylindrical members to effect said second brake application.

4. The control apparatus as recited in claim 1 said secondary means is further characterized by a housing having an actuation bore connected to at least one of said first and second bores and said reservoir, a piston located in said actuation bore and actuation means including first solenoid valve means for controlling communication between said first and second bores and said reservoir and second solenoid valve means for controlling communication between a source of pressurized fluid and said actuation bore, said first solenoid valve responding to an operational signal from actuation means to terminate communication between said first and second bores and said second solenoid valve responding to an operational signal from said actuation means to supply said actuation bore with pressurized fluid, said pressurized fluid acting on and moving said piston in said actuation bore to create a second pressurized fluid which is supplied to said first and second chambers to move said first and second cylindrical members to effect said second brake application.

5. The control apparatus as recited in claim 4 further characterized by actuation means being connected to sensors associated with the individual wheels of the vehicle whereby pressurized fluid is selectively supplied to individual wheel brakes to effect said second brake application and attenuate a dynamic condition.

6. A control apparatus through which pressurized fluid is supplied to wheel brakes by primary means acting in response to an operational input from an operator for effecting a first brake application and by secondary means acting in response to a dynamic input derived from the operation of a vehicle for independently effecting a second brake application, said control apparatus having a housing with a first cylindrical member located in a first bore and a second cylindrical member located in a second bore, said first cylindrical member and a first valve seat member defining a first chamber and said second cylindrical member and a second valve seat member defining a second chamber, said first and second chambers being connected to a source of pressurized fluid, first valve means located in said first chamber and second valve means located in said second chamber, first plunger means resiliently positioned in said first bore and with said first valve seat member defining a first brake chamber in said first bore, said first brake chamber being is connected to a first portion of said brake system, second plunger means resiliently positioned in said second bore and with said second valve seat defining a second brake chamber in said second bore, said second brake chamber being connected to a second portion of said brake system, said first plunger means including a first stem through which said first brake chamber is connected with a reservoir and said second plunger means including a second stem through which said second brake chamber is connected with said reservoir, and input means connected to said first and second plunger means and responsive to said input force for respectively moving said first and second stems into engagement with said first and second valve means to initially terminate communication between said first and second brake chambers and said reservoir and thereafter moving said first valve means with respect to said first valve seat member and said second valve means with respect to said second valve seat to allow metered pressurized fluid communication between said first chamber and said first portion of said brake system by way of said first brake chamber and between said second chamber and said second portion of said brake system by way of said second brake chamber to effect said first brake application, said secondary actuation means being characterized by first cylindrical means located in said first bore and connected to said first plunger means to define a first dynamic actuation chamber and second cylindrical means located in said second bore and connected to said second plunger means to define a second dynamic actuation chamber, and actuation means responsive to said dynamic signal for supplying said first and second dynamic actuation chambers with pressurized fluid which acts on and move said first and second plunger means with respect to said first and second valve means to initially interrupt communication through said first and second stems to said reservoir and thereafter initiating communication of metered pressurized fluid from said first and second chambers to said first and second portions of said brake system by way of said first and second brake chambers to effect a second brake application and attenuate the dynamic operation of the vehicle.

7. The brake system as recited in claim 6 wherein said actuation means is characterized by first solenoid valve means for controlling communication between said first and second dynamic actuation chambers and said reservoir and second solenoid valve means for controlling communication between a source of pressurized fluid and said dynamic actuation chambers, said first solenoid valve responding to an operational signal from actuation means to terminate communication between said first and second dynamic chambers and said second solenoid valve responding to an operational signal from said actuation means to supply said actuation bore with pressurized fluid, said pressurized fluid acting on and moving said first and second cylindrical members to moves said first and second plungers and effect said second brake application.

8. The brake system as recited in claim 7 wherein said actuation means is further characterized by being connected to sensors associated with the individual wheels of the vehicle whereby pressurized fluid is selectively supplied to individual wheel brakes to effect said second brake application and attenuate a dynamic condition.

9. A control apparatus through which pressurized fluid is supplied to wheel brakes by primary means acting in response to an operational input from an operator for effecting a first brake application and by secondary means acting in response to a dynamic input derived from the operation of a vehicle for independently effecting a second brake application, said control apparatus having a housing with a first cylindrical member located in a first bore and a second cylindrical member located in a second bore, said first cylindrical member and a first valve seat member defining a first chamber and said second cylindrical member and a second valve seat member defining a second chamber, said first and second chambers being connecting to a source of pressurized fluid, first valve means located in said first chamber and second valve means located in said second chamber, first plunger means resiliently positioned in said first bore and with said first valve seat member defining a first brake chamber in said first bore, said first brake chamber being is connected to a first portion of said brake system, second plunger means resiliently positioned in said second bore and with said second valve seat defining a second brake chamber in said second bore, said second brake chamber being connected to a second portion of said brake system, said first plunger means including a first stem through which said first brake chamber is connected with a reservoir and said second plunger means including a second stem through which said second brake chamber is connected with said reservoir, and input means connected to said first and second plunger means and responsive to said input force for respectively moving said first and second stems into engagement with said first and second valve means to initially terminate communication between said first and second brake chambers and said reservoir and thereafter moving said first valve means with respect to said first valve seat member and said second valve means with respect said second valve seat to allow metered pressurized fluid communication between said first chamber and said first portion of said brake system by way of said first brake chamber and between said second chamber and said second portion of said brake system by way of said second brake chamber to effect said first brake application, said secondary actuation means being characterized by piston means located in a third bore in said housing to define a dynamic actuation chamber, said piston means being linked with said input means, said piston means responding to a dynamic input signal by moving to providing a force which correspondingly moves said input means and said first and second plunger means to corresponding move said first and second valves to initially interrupt communication through said first and second stems to said reservoir and thereafter initiate communication of metered pressurized fluid from said first and second chambers to said first and second portions of said brake system by way of said first and second brake chambers to independently effect a brake application which attenuate said operation of the vehicle.

10. The control apparatus as recited in claim 9 wherein said secondary actuation means further includes first solenoid valve means for controlling communication between said dynamic actuation chamber and said reservoir and second solenoid valve means for controlling communication between a source of pressurized fluid and said dynamic actuation chamber, said first solenoid valve responding to an operational signal from actuation means to terminate communication between said dynamic chamber and said second solenoid valve responding to an operational signal from said actuation means to supply said actuation chamber with pressurized fluid, said pressurized fluid acting on and moving said piston to move said first and second plungers and effect said second brake application.

11. The control apparatus system as recited in claim 10 wherein said secondary actuation means is further characterized by being connected to sensors associated with the individual wheels of the vehicle whereby pressurized fluid is selectively supplied to individual wheel brakes to effect said second brake application and attenuate a dynamic condition.

* * * * *